United States Patent
Braun et al.

(10) Patent No.: US 12,118,797 B2
(45) Date of Patent: Oct. 15, 2024

(54) METHOD FOR DETERMINING A SEMANTIC SEGMENTATION OF AN ENVIRONMENT OF A VEHICLE

(71) Applicant: Aptiv Technologies AG, Schaffhausen (CH)

(72) Inventors: Marco Braun, Düsseldorf (DE); Moritz Luszek, Detmold (DE); Jan Siegemund, Cologne (DE)

(73) Assignee: Aptiv Technologies AG, Schaffhausen (CH)

( * ) Notice: Subject to any disclaimer, the term of this patent is extended or adjusted under 35 U.S.C. 154(b) by 450 days.

(21) Appl. No.: 17/457,339

(22) Filed: Dec. 2, 2021

(65) Prior Publication Data

US 2022/0172485 A1 Jun. 2, 2022

(30) Foreign Application Priority Data

Dec. 2, 2020 (EP) .................................... 20211270

(51) Int. Cl.
*G06V 20/56* (2022.01)
*B60W 40/10* (2012.01)
(Continued)

(52) U.S. Cl.
CPC ............. *G06V 20/56* (2022.01); *B60W 40/10* (2013.01); *G06F 18/24155* (2023.01);
(Continued)

(58) Field of Classification Search
CPC .................. G06V 20/56; B60W 40/10; B60W 2420/408; B60W 2420/403; G06N 3/02
See application file for complete search history.

(56) References Cited

U.S. PATENT DOCUMENTS 10,732,261 B1 8/2020 Wang et al.
11,816,185 B1 * 11/2023 Roth .................. G06V 10/7753
(Continued)

FOREIGN PATENT DOCUMENTS

EP 3722894 10/2020
WO 2020188120 9/2020

OTHER PUBLICATIONS

Depeweg et al.(Decomposition of Uncertainty in Bayesian Deep Learning for Efficient and Risk-Sensitive Learning, 10-pages) (Year : 2017).*

(Continued)

*Primary Examiner* — Bernarr E Gregory
*Assistant Examiner* — Hailey R Le
(74) *Attorney, Agent, or Firm* — Harness, Dickey & Pierce, P.L.C.

(57) ABSTRACT

A method is provided for semantic segmentation of an environment of a vehicle. Via a processing device, a grid of cells is defined dividing the environment of the vehicle. A radar point cloud is received from a plurality of radar sensors, and at least one feature of the radar point cloud is assigned to each grid cell. By using a neural network including deterministic weights, high-level features are extracted for each grid cell. Several classes are defined for the grid cells. For layers of a Bayesian neural network, various sets of weights are determined probabilistically. Via the Bayesian neural network, confidence values are determined for each class and for each grid cell based on the high-level features and based on the various sets of weights in order to determine a predicted class and an extent of uncertainty for the predicted class for each grid cell.

13 Claims, 7 Drawing Sheets

(51) Int. Cl.
*G06F 18/2415* (2023.01)
*G06N 3/02* (2006.01)

(52) U.S. Cl.
CPC ......... *G06N 3/02* (2013.01); *B60W 2420/403* (2013.01); *B60W 2420/408* (2024.01)

(56) References Cited

U.S. PATENT DOCUMENTS

| | | | | |
|---|---|---|---|---|
| 2021/0009166 | A1* | 1/2021 | Li | G06F 16/909 |
| 2021/0156960 | A1* | 5/2021 | Popov | G06V 10/764 |
| 2021/0334556 | A1* | 10/2021 | Vignard | G06V 20/58 |
| 2022/0067737 | A1* | 3/2022 | Wittenbach | G06Q 20/4016 |
| 2022/0111868 | A1* | 4/2022 | Costea | G06V 20/56 |
| 2023/0386167 | A1* | 11/2023 | Fuelster | G06V 10/776 |

OTHER PUBLICATIONS

"Extended European Search Report", EP Application No. 20211270. 2, May 31, 2021, 13 pages.

Blei, et al., "Variational Inference: Foundation and Modern Methods", Dec. 2016, 162 pages.

Chai, "Uncertainty Estimation in Bayesian Neural Networks And Links to Interpretability", Aug. 2019, 78 pages.

Chen, et al., "DeepLab: Semantic Image Segmentation with Deep Convolutional Nets, Atrous Convolution, and Fully Connected CRFs", Jun. 2, 2016, 14 pages.

Feng, et al., "Leveraging Heteroscedastic Aleatoric Uncertainties for Robust Real-Time LiDAR 3d Object Detection", Jun. 2019, pp. 1280-1287.

Feng, et al., "Towards Safe Autonomous Driving: Capture Uncertainty in the Deep Neural Network for Lidar 3D Vehicle Detection", Nov. 2018, pp. 3266-3273.

Gal, et al., "Dropout as a Bayesian Approximation: Representing Model Uncertainty in Deep Learning", Oct. 4, 2016, 12 pages.

Graves, et al., "Practical Variational Inference for Neural Networks", Dec. 2011, 9 pages.

Kendall, et al., "Bayesian SegNet: Model Uncertainty in Deep Convolutional Encoder-Decoder Architectures for Scene Understanding", Oct. 10, 2016, 11 pages.

Kendall, et al., "What Uncertainties Do We Need in Bayesian Deep Learning for Computer Vision?", Oct. 5, 2017, 12 pages.

Liat, "Self-Supervised Occupancy Grid Learning From Sparse Radar For Autonomous Driving", Mar. 31, 2019, 9 pages.

Weston, et al., "Probably Unknown: Deep Inverse Sensor Modelling In Radar", May 10, 2019, 7 pages.

* cited by examiner

METHOD FOR DETERMINING A SEMANTIC SEGMENTATION OF AN ENVIRONMENT OF A VEHICLE

CROSS-REFERENCE TO RELATED APPLICATION

This application claims priority to European Patent Application Number 20211270.2, filed Dec. 2, 2020, the disclosure of which is hereby incorporated by reference in its entirety herein.

BACKGROUND

For driver assistance systems, it is essential that a reliable perception of an environment of a vehicle is available. This especially holds true if a driver assistance system is used for autonomous driving. For the perception of the environment of the vehicle, many modern vehicles are equipped with one or more radar sensors providing signals which include information about objects in the vicinity of the vehicle, e.g. their distance with respect to the vehicle, their velocity etc.

It is therefore desirable to use such radar signals being available on a vehicle in order to derive assumptions regarding the segmentation of regions around the vehicle. In detail, regions around the vehicle may be defined within a horizontal grid comprising grid cells. In order to perform the perception of the environment of the vehicle, it is to be determined for each grid cell whether this cell is e.g. occupied, free or unobservable. This procedure and similar procedures related to segments within the environment of the vehicle are also referred to as semantic segmentation.

The task of semantic segmentation of the environment of the vehicle has been recently performed using neural networks. The performance of such neural networks and in general of any algorithm based on machine learning strongly depends on the quality of the information which is available for the network or the algorithm during training, i.e. information that the network or algorithm can extract from pairs of input and ground truth.

Radar data captured from an environment of a vehicle is inherently noisy and may provide sparse information. Thus, the performance of a neural network used for semantic segmentation based on radar data is limited, and errors regarding the prediction of a neural network may be likely. It may even be inevitable that the neural network occasionally fails to perform the semantic segmentation task. In addition, there may be some additional uncertainty for the learned neural network after training regarding the parameters or weights which map input data to output data.

The algorithms using neural network for semantic segmentation based on radar data so far have not been able to provide a quantitative assessment of the uncertainty regarding the prediction of the neural network. This missing information regarding uncertainty may lead to dramatic accidents if the prediction is used e.g. for navigating a vehicle via a driver assistance system.

Accordingly, there is a need to have a method and a system for determining a semantic segmentation of an environment of a vehicle which is able to provide reliable information regarding the uncertainty of the resulting semantic segmentation.

SUMMARY

The present disclosure relates to a method for determining a semantic segmentation of an environment of a vehicle and for estimating an extent of uncertainty of the semantic segmentation. The present disclosure provides a computer implemented method, a computer system, and a non-transitory computer readable medium according to the embodiments given in the claims, the description, and the drawings.

In one aspect, the present disclosure is directed at a computer implemented method for determining a semantic segmentation of an environment of a vehicle which includes a plurality of radar sensors and a processing device configured to establish a deterministic neural network and a Bayesian neural network. The method comprises a feature extracting stage which includes defining, via the processing device, a grid of cells dividing the environment of the vehicle, receiving a radar point cloud from the plurality of radar sensors, assigning at least one feature of the radar point cloud to each grid cell, and extracting, by using the deterministic neural network including deterministic weights, high-level features for each grid cell. The method further comprises a classification stage which includes defining several classes for the grid cells, determining, for layers of the Bayesian neural network, various sets of weights probabilistically, and estimating, via the Bayesian neural network, confidence values for each class and for each grid cell based on the high-level features and based on the various sets of weights. Finally, the method comprises a post processing stage which includes determining, for each grid cell, a predicted class, and an extent of uncertainty for the predicted class based on the estimated confidence values.

The radar point cloud includes radar reflections from objects in the environment of the vehicle and is received from the plurality of radar sensors which may be combined in a Cartesian coordinate system. In detail, each radar sensor includes a transmitter and a receiver for detecting the reflections from the objects. The at least one feature of the radar point cloud may include an amount of radar detections per grid cell, an average radar cross section of radar detections within each cell, amongst others. The at least one feature is transferred from points of the radar point cloud to the assigned grid cells. If there are no radar detections within a certain grid cell, for example, all features of this cell are set to zero.

The high-level features comprise spatially local correlations of the input data, i.e. of the at least one feature of the radar point cloud with respect to the grid cells. The high-level features are therefore defined mathematically within an intermediate layer of the neural networks only and do therefore not have a direct relationship to a physical entity like the input features of the radar point cloud. In other words, the feature extraction layers of the deterministic neural network "decide by themselves" how the information about patterns is encoded when the layers of the network extract the high-level features from the input data, i.e. from the at least one feature of the radar point cloud.

The deterministic neural network in the feature extracting stage may be a convolutional neural network having fully connected layers. For example, a dense feature extraction with a so-called atrous convolution and an atrous spatial pyramid tooling (ASPP) may be used.

Regarding the classes for the grid cells, e.g. four classes may be defined which are labeled "free", "occupied", "moving" and "unknown". In this example, the post processing stage assigns one of these classes to each grid cell and determines an extent of uncertainty for each grid cell as well. Since more than one set of weights and more than one confidence value are estimated by the Bayesian neural network, a variability for estimating the confidence values and the predicted classes is provided from which a so-called epistemic or model uncertainty is estimated which is detailed below, in addition to a so-called aleatoric uncertainty which is based e.g. on the noise of the input data.

The uncertainty for the semantic segmentation and therefore for the perception of the environment of the vehicle is useful for advanced driver assistance systems up to autonomous driving and may help to avoid dramatic accidents. Furthermore, a hybrid construction of a deterministic and a probabilistic neural network is established by the method which approximately requires half of the number of probability distributions only in comparison to a fully Bayesian neural network for the feature extracting stage and for the classification stage. Hence, the method is computationally efficient, and performing the method is therefore feasible on a computer system of a vehicle.

The method may comprise one or more of the following features:

The extent of uncertainty may include an epistemic uncertainty and an aleatoric uncertainty. The aleatoric uncertainty may be estimated based on an expected entropy of samples from the deterministic and Bayesian neural networks having fixed weights. Furthermore, a predictive uncertainty may be estimated based on an entropy of an expected output of the Bayesian neural network, and the epistemic uncertainty is estimated as a difference of the predictive uncertainty and the aleatoric uncertainty.

In the classification stage, the various sets of weights may be determined in a predefined number of iterations, each iteration providing a respective set of weights and respective confidence values for each class and each grid cell. In the post processing stage, a mean value over the respective confidence values of the predefined number of iterations may be calculated for each class and for each grid cell, and the highest mean value for each grid cell may define the predicted class of the respective cell.

In the classification stage, samples from learned probability distributions may be determined for each set of weights of the Bayesian neural network. For determining the samples, a Gaussian distribution may be used in order to approximate a posterior distribution. In each iteration, the high-level features may be convolved with the respective set of weights which may be sampled from the learned probability distributions. A SoftMax function may applied to the result of the convolution of the high-level features with the respective set of weights in each iteration in order to estimate a normalized confidence value for each class for the respective iteration. In the classification stage, the neural network may alternatively include a dropout layer and various deterministic layers.

The at least one feature of the radar point cloud may include an amount of radar detections per cell, an average Doppler value for each cell, an average distance of each cell to the radar sensors, an average azimuth angle of each cell and/or an average radar cross section of radar detections within each cell.

According to an embodiment, the extent of uncertainty may include an epistemic uncertainty and an aleatoric uncertainty. In general, the epistemic uncertainty refers to an uncertainty regarding the model parameters or weights which are used for the neural network. In contrast, the aleatoric uncertainty refers to the uncertainty caused by the input data, for example by the noise of the radar signals generating the radar point cloud for which at least one feature is used as input for the feature extracting stage of the method. Decomposing the extent of uncertainty in the epistemic and aleatoric uncertainties may be important for applications which use the output of the method, e.g. for driver assistance systems.

The aleatoric uncertainty may be estimated based on an expected entropy of samples from the deterministic and Bayesian neural networks. For estimating the expected entropy, the entire neural network, i.e. the deterministic neural network and Bayesian neural network, may have fixed weights. Since such an expected entropy is independent from the uncertainty of the network parameters and therefore exclusively depending on input data, it may be a suitable estimate of the aleatoric uncertainty. Furthermore, a predictive uncertainty may be estimated based on an entropy of an expected output of the Bayesian neural network, and the epistemic uncertainty may be estimated as a difference of the predictive uncertainty and the aleatoric uncertainty which has been estimated based on the expected entropy over the weights. That is, a straightforward manner may be defined for estimating the epistemic uncertainty based on the expected entropies.

According to a further embodiment, the various sets of weights are determined in the classification stage in a predefined number of iterations, wherein each iteration provides a respective set of weights and respective confidence values for each class and for each grid cell. Due to the predefined number of iterations for determining the sets of weights, a defined variability may be generated for applying the Bayesian neural network to the high-level features which are extracted in the first stage of the method. The variability may allow for a reliable estimation of the uncertainty regarding the predicted class for each grid cell.

In the post processing stage, a mean value over the respective confidence values of the predefined number of iterations may be calculated for each class and for each grid cell. The highest mean value for each grid cell may define the predicted class for the respective cell. Calculating a mean value over the iteration may be a straightforward manner for estimating the probability for a cell to belong to a certain class. The confidence values for all iterations may be concatenated after the weights are determined probabilistically for the Bayesian neural network and before the weights are marginalized, i.e. before calculating the respective mean values. This marginalization may be performed via a Monte Carlo procedure.

According to a further embodiment, samples from learned probability distributions are determined in the classification stage for each set of weights of the Bayesian neural network. Moreover, these samples may be convolved in each iteration with the high-level features being extracted in the first stage of the method from the input feature or features of the radar point cloud. Hence, the application of probability distributions which is quite costly from the computational point of view may be restricted to the second or classification stage of the method, whereas the first or feature extracting stage relies on a deterministic neural network. Therefore, the computational effort of the method may be reduced in comparison to a fully Bayesian neural network including all relevant layers. In addition, the variability which is required for a reliable determination of the uncertainty for the predicted class for each cell may be improved by selecting a suitable probability distribution including parameters which may be learned during a training phase of the neural network.

In each iteration, a SoftMax function may be applied to the result of the convolution of the high-level features with the respective set of weights in order to estimate a normalized confidence value for each class for the respective iteration. That is, the SoftMax function is applied to the output of the last layer of the Bayesian neural network in order to provide the normalized confidence values which sum up to one for each cell of the grid. In detail, the SoftMax function may be applied to the outputs of the convolutional layers of the Bayesian neural network.

For determining the samples from the learned probability distribution in the classification stage, a Gaussian distribution may be used in order to approximate a posterior distribution. As is known in the field of Bayesian neural networks, a posterior distribution is a priori not available for a straightforward calculation and needs to be approximated properly. Using a Gaussian distribution is a straightforward manner for such an approximation requiring a low computational effort since this probability distribution may be controlled by the mean value and the standard deviation as parameters only.

According to a further embodiment, the neural network may include a dropout layer and various deterministic layers in the classification stage. Within the dropout layer, the weights for some high-level features being output by the feature extracting stage may be randomly set to zero before the further deterministic layers are applied. Due to this random selection of high-level features which are set to zero, the classification stage of the method may be regarded as probabilistic and referred to also as a Bayesian neural network. In this embodiment, the sampling from probability distributions as described above may be replaced by the dropout layer and the further various deterministic layers. Since no probability distributions are required for this embodiment, less parameters and therefore less memory is required in comparison to the embodiment described above which relies on the sampling from probability distributions.

As a further alternative, a fully Bayesian architecture for both of the feature extracting stage and of the classification stage may be provided. The weights of both stages may therefore be determined based on sampling from learned probability distributions. This may lead to improved results of the semantic segmentation, but may increase the computational effort, i.e. the cost regarding calculation and memory usage.

The at least one feature of the radar point cloud may include an amount of radar detections per cell, an average Doppler value for each cell, an average distance of each cell to the radar sensors, an average azimuth angle of each cell and/or an average radar cross section of radar detections within each cell. Hence, one or more of these features may be directly derived from the radar point cloud and assigned to the grid cells.

In another aspect, the present disclosure is directed at a system for determining a semantic segmentation of an environment of a vehicle. The system comprises a plurality of radar sensors and a processing device configured to establish a deterministic neural network and a Bayesian neural network. The processing device includes a feature extracting module configured to define a grid of cells dividing the environment of the vehicle, to receive a radar point cloud from the plurality of radar sensors, to assign at least one feature of the radar point cloud to each grid cell, and to extract, by using the deterministic neural network including deterministic weights, high-level features for each grid cell. The processing device further includes a classification module configured to define several classes for the grid cells, to determine, for layers of the Bayesian neural network, various sets of weights probabilistically, and to estimate, via the Bayesian neural network, confidence values for each class and for each grid cell based on the high-level features and based on the various sets of weights. Finally, the processing device includes a post processing module configured to determine, for each grid cell, a predicted class, and an extent of uncertainty for the predicted class based on the estimated confidence values.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

In summary, the system according to the disclosure includes the plurality of radar sensors and the processing device including three modules which are installed in the vehicle and which are configured to perform the steps as described above for the corresponding method. Therefore, the benefits, the advantages and the disclosure as described above for the method are also valid for the system according to the disclosure.

In another aspect, the present disclosure is directed at a computer system, said computer system being configured to carry out several or all steps of the computer implemented method described herein.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM); a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Figure 1:
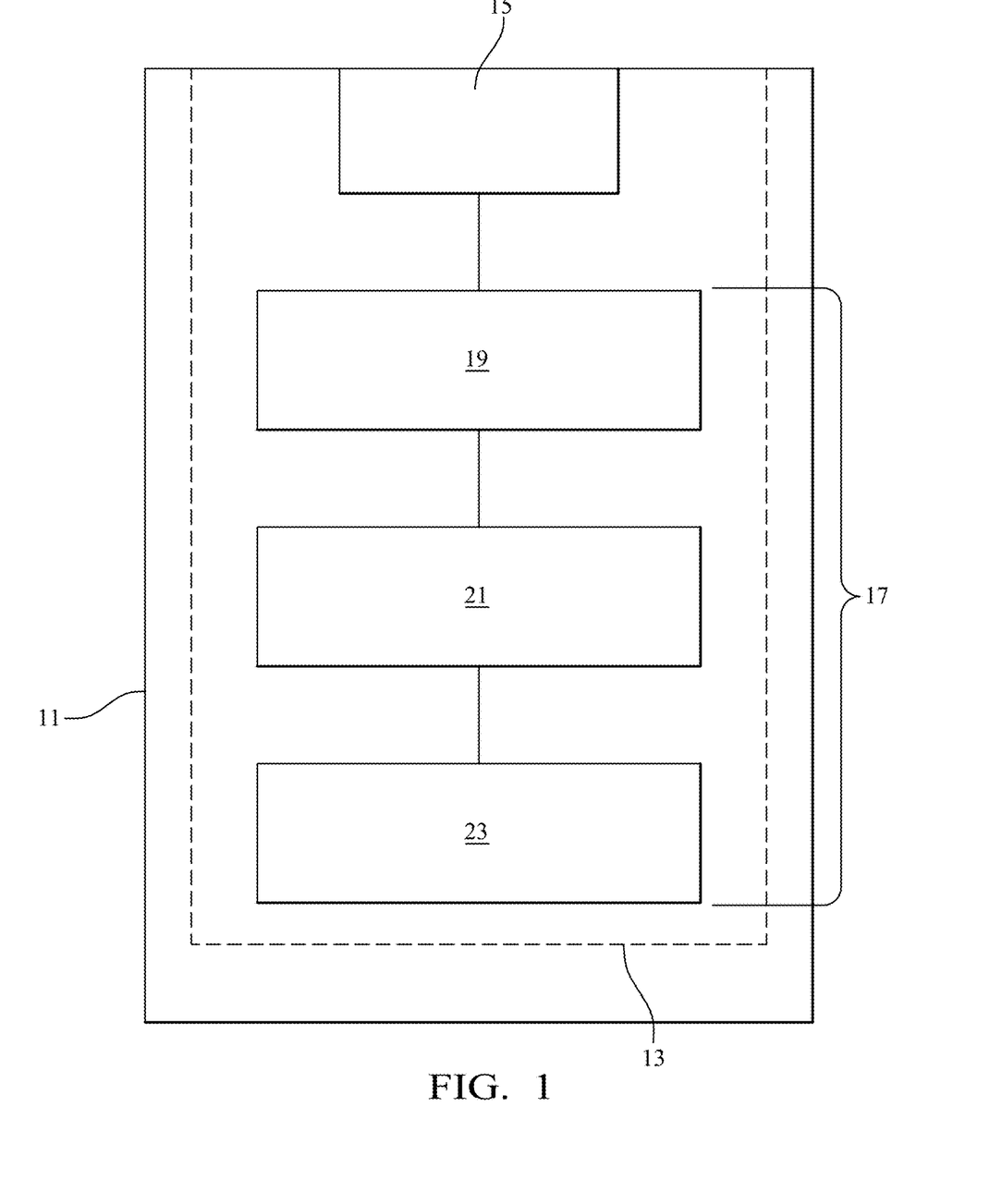
FIG. 1 depicts a diagram of a vehicle comprising a system according to the disclosure.

FIG. 1 schematically depicts a vehicle 11 which is equipped with a system 13 according to the disclosure. The system 13 includes a plurality of radar sensors 15 for monitoring the environment of the vehicle 11 and a processing device 17 which is configured to perform the method as described below in order to determine a semantic segmentation of the environment of the vehicle 11. The system 13 may include four radar sensors 15, however, the exact number of radar sensors 15 is of minor importance as long as a useful radar point cloud is provided (see below) as input for the system 13.

The processing device 17 includes a feature extracting module 19, a classification module 21 and a post processing module 23. Each of the modules 19, 21, 23 is assigned to a respective one of different stages 31, 33, 35 (see FIG. 2) of the method according to the disclosure. Therefore, each of the modules 19, 21, 23 performs a respective part of method steps which belong to the different stages 31, 33, 35.

For the environment of the vehicle 11, a grid 25 of cells 27 (see FIG. 2) is defined by the processing device 17. The grid 25 is defined in a plane tangent to a lane in which the vehicle 11 is currently driving. In this plane, the grid 25 extends in x- and y-directions and therefore includes an amount of $C_x$ times $C_y$ cells 27.

The radar sensors 15 (see FIG. 1) includes a transmitter for sending radar signals into the environment of the vehicle 11 and a receiver for detecting reflections of the transmitted radar signals. Hence, a radar point cloud is provided by the radar sensors 15 wherein each point of the point cloud is related to a grid cell 27. In addition, features 29 of the radar point cloud are assigned to each grid cell 27. The features 29 include the amount of radar detections per grid cell 27, average doppler values for each grid cell 27, an average distance of the respective cell 27 to the radar sensors 15, an average azimuth and/or an average radar cross section of the radar detections within each cell 27. These features and the cells 27 are used as input data for the method as described below.

Figure 2:
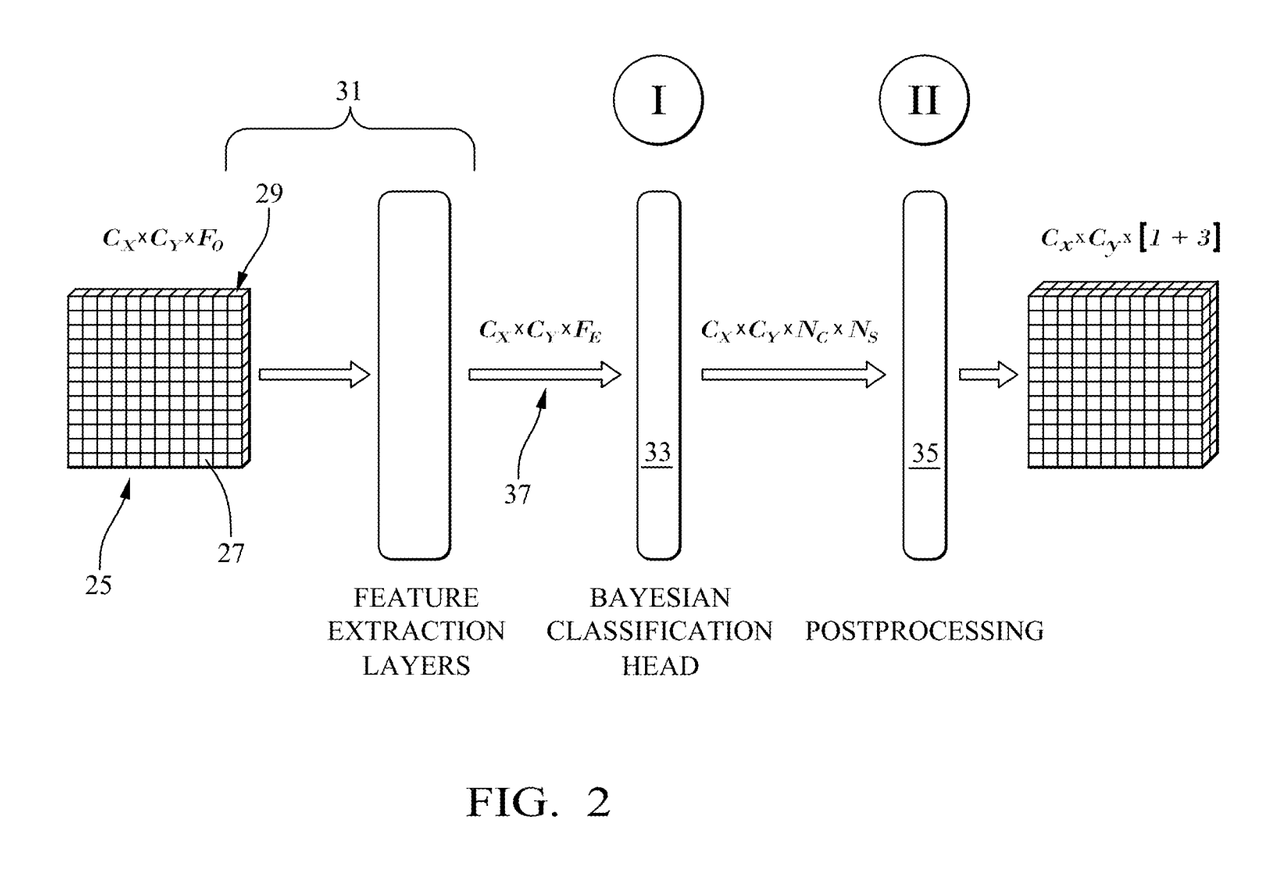
FIG. 2 depicts an overview of different stages of a method according to the disclosure, FIG. 3 visualizes an approximation used in a classification stage of the method as shown in FIG. 2.

FIG. 2 depicts an overview of the method according to the disclosure including a feature extracting stage 31, a classification stage 33, and a post processing stage 35. In addition to the acquisition of input data as described above, the feature extracting stage 31 includes feature extraction layers of a neural network, and the classification stage 33 includes a Bayesian classification head having also layers of a neural network. Hence, the feature extraction layers, and the Bayesian classification head together form a neural network including layers which are trained at the same time. In contrast, the post processing stage performs estimations based on the output of the neural network in order to generate the desired output of the method.

The method steps of the feature extracting stage 31 are performed by the feature extracting module 19 (see FIG. 1). The feature extraction layers of the feature extracting stage 31 are a neural network having deterministic or fixed weights within each layer. For $F_0$ features of the radar point cloud assigned to each of $C_x \times C_y$ grid cells 27 as input, the feature extraction layers of the feature extracting stage 31 generate FE high-level features 37 which are also assigned to each grid cell 27, providing the input for the layers of the classification stage 33.

The method steps of the classification stage 33 are performed by the classification module 21 (see FIG. 1). The layers of the classification stage 33 form a Bayesian neural network which relies on probability distributions or probabilistic weights within each layer. The weights in the Bayesian neural network of the classification stage 33 are defined by Gaussian distributions, in contrast to the fixed weights in the layers of the feature extracting stage 31.

Figure 5:
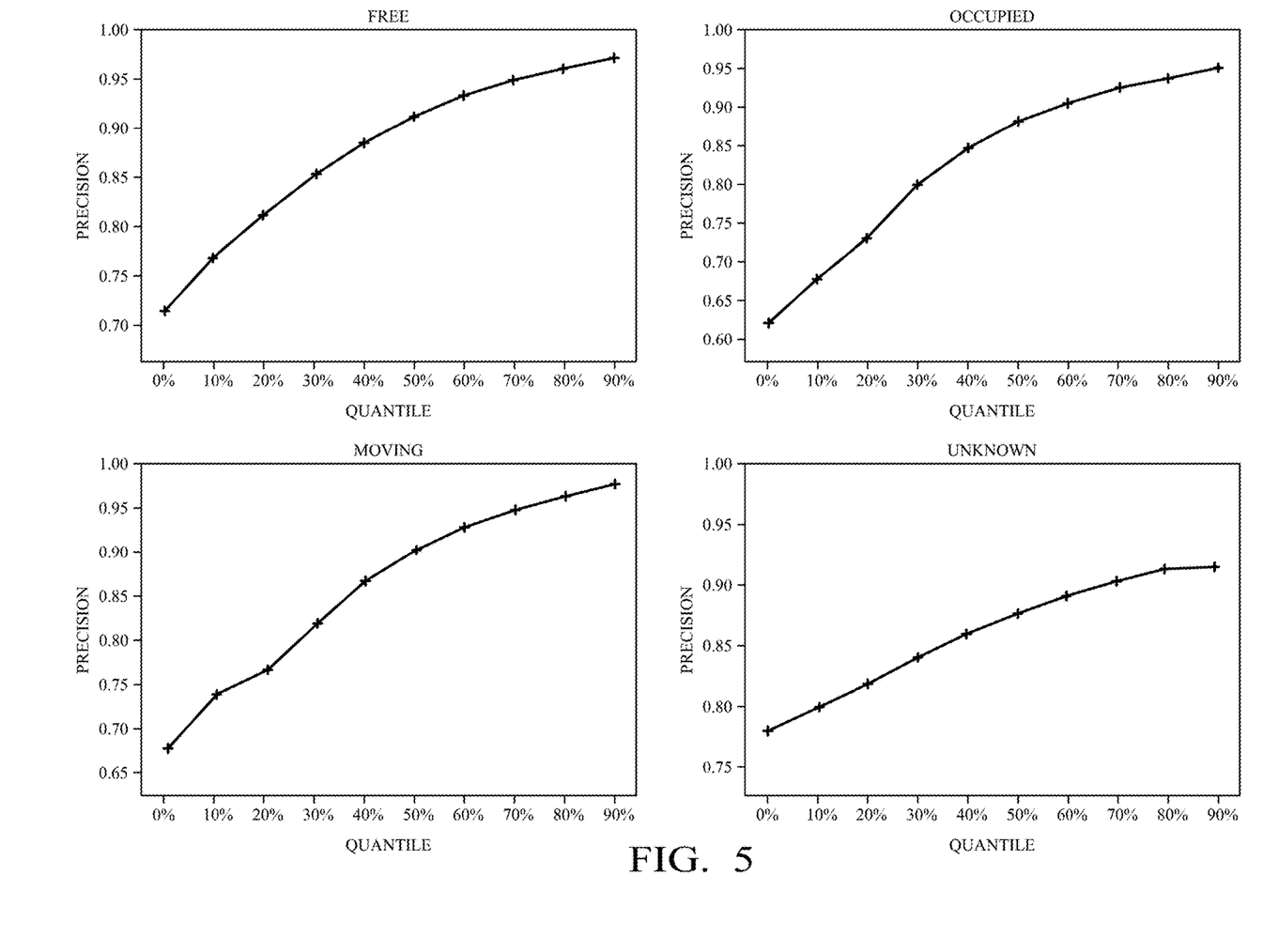
FIG. 5 depicts an example for a correlation of an aleatoric uncertainty with precision when performing the method as shown in FIG. 2.
Figure 6:
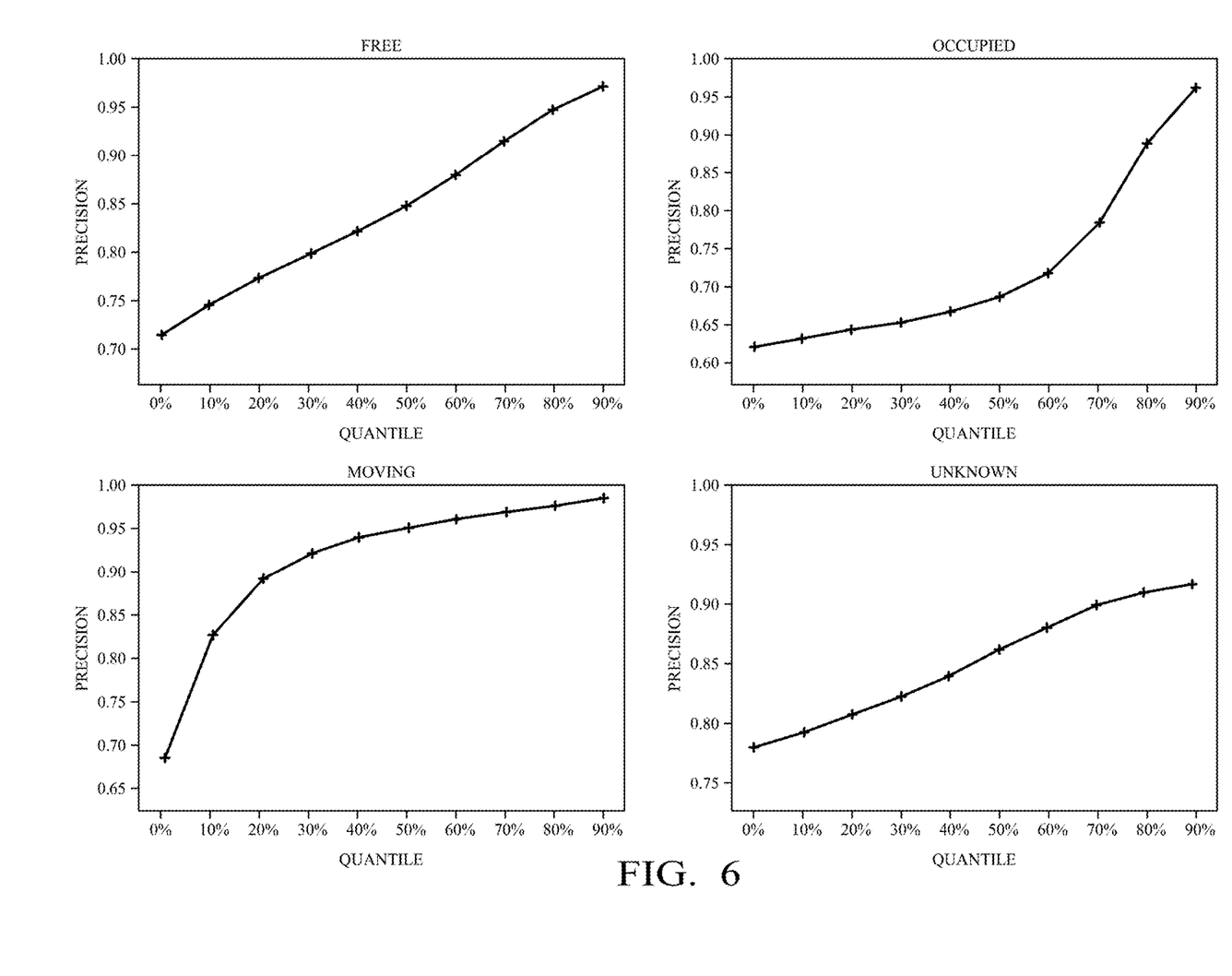
FIG. 6 depicts an example for the correlation of an epistemic uncertainty with precision when performing the method as shown in FIG. 2.

For the classification stage, $N_C$ classes are defined for classifying the grid cells 27 of the environment of the vehicle 11. For example, four classes are defined having the respective labels "free", "occupied", "moving" and "unknown". These classes also correspond to the respective diagrams as shown in FIGS. 5 and 6. Hence, the label of each class represents a property of each cell.

Furthermore, in the classification stage 33 samples from probability distributions 39 (see FIG. 4) are generated on the weights of each layer of the Bayesian neural network. This sampling is repeated $N_S$ times in order to get varying outputs for the $N_C$ classes. These outputs represent class confidences for each cell. The outputs for the $N_S$ repetitions or iterations 41 (see also FIG. 4) within the classification stage 33 are concatenated in order to define the input for the post processing stage 35.

The method steps of the post processing stage 35 are performed by the post processing module 23 (see FIG. 1). In the post processing stage 35, the output of the classification stage 33 is marginalized over the $N_S$ iterations for each cell in order to obtain confidence values for each class. Therefore, the variability of the confidence or probabilities which are output by the Bayesian neural network are marginalized out. In detail, mean values are calculated for each class and for each cell over the probability values provided by the iterations. The highest mean value for each cell defines a predicted class, i.e. for the present example whether the respective cell is classified as free, occupied, moving or unknown. In addition, an uncertainty is estimated for each predicted class and for each cell.

The $N_S$ repetitions or iterations on each weight of the layers of the Bayesian neural network generate variability for the output of the classification stage 33. This variability allows for estimating a respective epistemic uncertainty for the predicted class for each cell which is described below. Therefore, the method provides the classification for each cell used for a semantic segmentation of the environment of the vehicle 11 and an uncertainty estimation for this classification. This is represented by the two layers of the grid of cells on the right side of FIG. 2, wherein one grid layer represents the classified cells and the other grid layer represents the sum of the epistemic uncertainty and a aleatoric uncertainty which is also described below.

Since the neural network of the feature extracting stage 31 includes deterministic or fixed weights and the Bayesian neural network of the classification stage 33 includes probabilistic weights, a hybrid network structure is generated including deterministic and probabilistic layers. Since the probability distribution being required for the Bayesian neural network entail a higher computational effort than the deterministic weights of the feature extracting stage 31, the computational effort is strongly reduced due to the hybrid structure in comparison to the use of a fully probabilistic Bayesian neural network for both stages 31 and 33. Due to this reduction of the computational effort, the method according to the disclosure can be performed on a computer system within a vehicle.

For performing the feature extraction in the feature extracting stage 31, a so-called atrous spatial pyramid pooling (ASPP) is applied which is described in detail e.g. in Chen at al.: "DeepLab: Semantic Image Segmentation with Deep Convolutional Nets, Atrous Convolution, and Fully Connected CRFs", arXiv:1606.00915v2, May 12, 2017. ASPP uses a dilated convolutional neural network for performing a semantic segmentation task. The cell based high-level features 37 which are generated by the deterministic feature extracting stage 31 represent spatially local correlation which are not directly comprehensible or directly related to the features of the radar point cloud mentioned above. In other words, the high-level feature 37 exist "between" the deterministic layers of the feature extracting stage 31 and the probabilistic layers of the classification stage 33 only.

The uncertainty which is determined by the post processing stage 35 includes a so-called aleatoric uncertainty and a so-called epistemic uncertainty. The aleatoric uncertainty relates to the uncertainty caused by the input, e.g. by the inherent noise of the radar signals which are received by the radar sensors 15 (see FIG. 1). In contrast, the epistemic uncertainty relates to a model uncertainty within a neural network, i.e. regarding its parameters or weights, and reflects the missing knowledge regarding the model which generated the collected data provided as input.

When using neural networks for semantic segmentation of an environment of a vehicle, systems according to the related art have mostly considered aleatoric uncertainty only. The aleatoric uncertainty, however, is not able to consider uncertainty for situations which have not been considered when training the network. Therefore, epistemic uncertainty has also to be considered for providing reliable predictions for the total uncertainty when performing a semantic segmentation for the grid cells 27.

For estimating the model or epistemic uncertainty, in a Bayesian neural network, i.e. in the classification stage 33, a so-called posterior distribution p(W|X,Y) needs to be calculated or approximated, as is commonly known in the field of Bayesian probability theory. In the present case, W is one of the model weights to be used in the layer of the Bayesian neural network, whereas X and Y are the input and output data, respectively, on which the neural network is trained. As is also known, the actual posterior distribution can usually not be computed directly, i.e. analytically, and therefore needs to be approximated by a simplified distribution $q_\theta(W)$ comprising parameters which are represented by $\theta$. For the present examples, the Gaussian distribution is used for q, wherein the parameters $\theta$ are the mean value $\mu$ and the standard deviation $\sigma$. In detail, for the approximation of the posterior distribution p, a Gaussian distribution is used as a so-called prior probability distribution. For the present example related to semantic segmentation of an environment of a vehicle, using $\mu=0$ and $\sigma=1$ as parameters for the Gaussian distribution used as prior or initial distribution (see below) turned out to provide suitable results.

Figure 3:
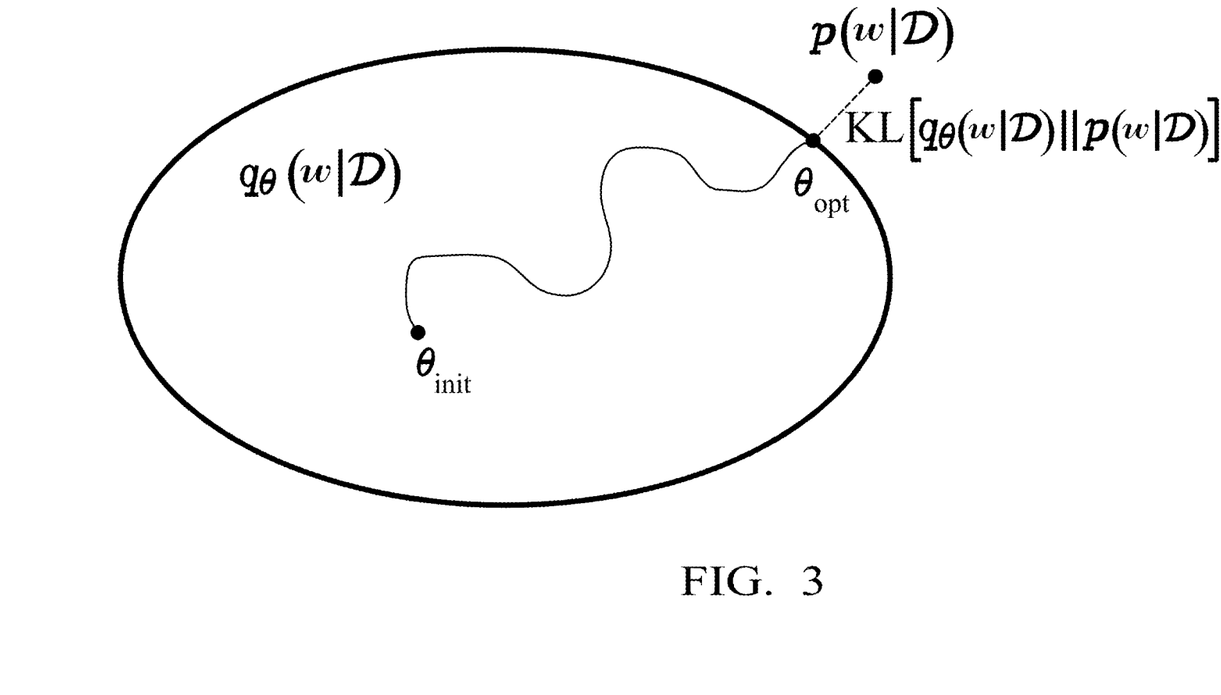

In addition, for the approximation of the posterior distribution by $q_\theta(W)$ a so-called variational inference is applied in which a so-called Kullback-Leibler divergence (KL-divergence) between the actual posterior distribution b and the approximating Gaussian distribution has to be minimized. The concept of variational inference is described in detail in Graves et al.: "Practical Variational Inference for Neural Networks", NIPS 2011. The process of variational inference is depicted in FIG. 3 which is taken from Blei et al.: "Variational Inference: Foundations and Modern Methods," NIPS 2016 Tutorial•Dec. 5, 2016. The variation procedure is running from $\theta_{init}$, the starting parameters for q, up to $\theta_{opt}$, the parameters for q which minimize the KL divergence. The remaining difference KL between the optimized Q and the actual posterior distribution p represents the minimum KL divergence. In summary, the Gaussian distribution used as prior probability distribution is turned into the approximated posterior probability distribution via the variational inference process. As result, a Gaussian distribution is generated on each weight of the Bayesian neural network within the classification stage 33. This Gaussian distribution is parametrized by a learned mean value $\mu$ and a learned standard deviation $\sigma$ which are received during a training procedure of the entire neural network.

In summary, during the training of the entire neural network (i.e. the deterministic and the probabilistic layers) the Gaussian distributions are optimized on the weights of the Bayesian neural network, which is fundamental for the proper functionality of the entire approach. The neural network is trained by defining the KL divergence as loss and then training the neural network by backpropagation. In other words, the Gaussian distributions are trained on the weights of the Bayesian neural network together with the training of the deterministic weights of the feature extracting layers.

Figure 4:
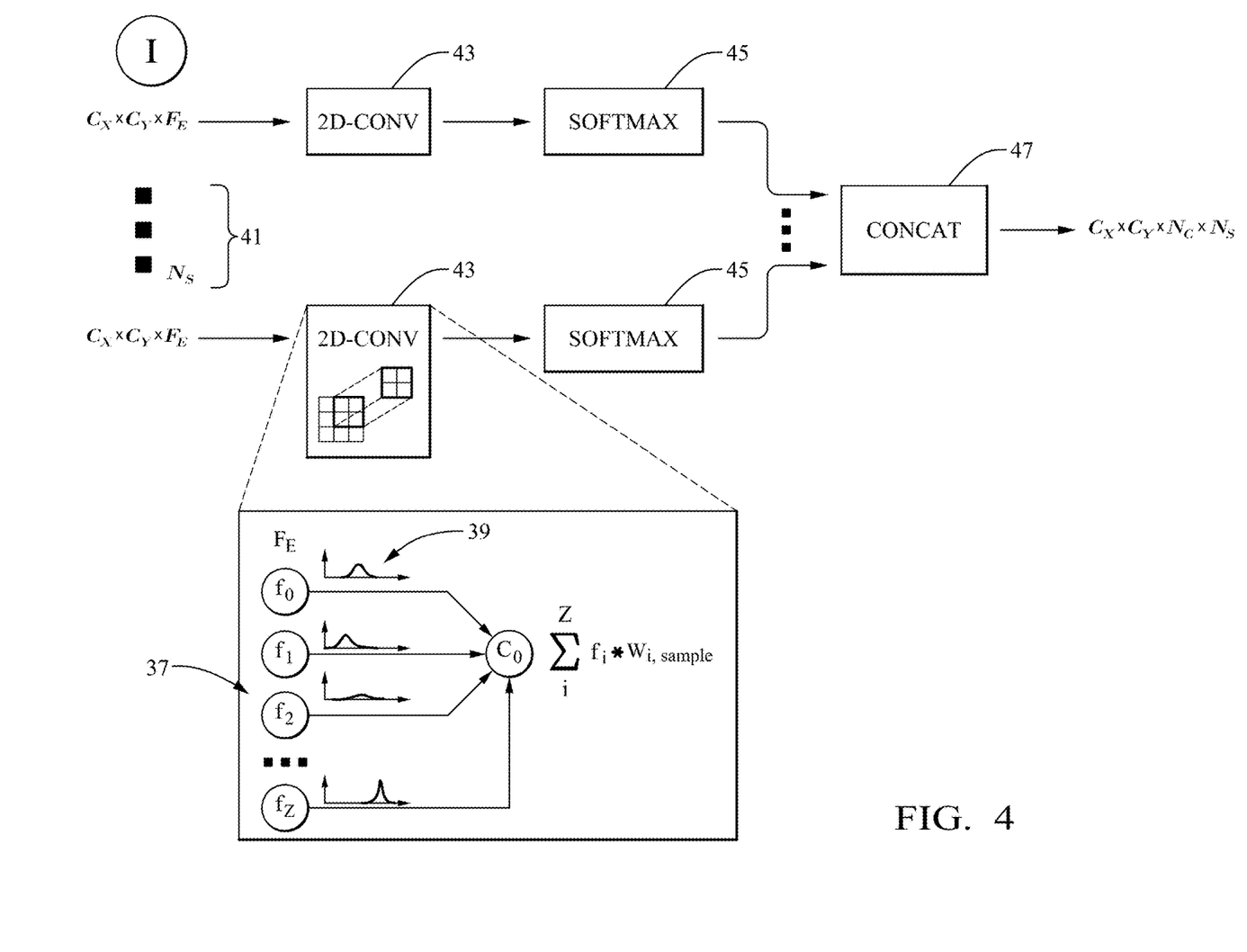
FIG. 4 depicts details of the classification stage of the method as shown in FIG. 2.

FIG. 4 depicts details of the classification stage 33 (see also FIG. 2). The high-level features 37 for each grid cell are convolved with weights which are sampled from the learned probability distribution which is described in context of FIG. 3. The convolution is shown for each high-level feature $f_0$, $f_1, \ldots f_z$ in the lower enlarged part of FIG. 4.

To the result of each convolution, i.e. for each cell, a so-called SoftMax function or normalized exponential function is applied in order to obtain normalized confidence value. The procedure of convolution and applying the SoftMax function is performed $N_S$ times, i.e. for $N_S$ iterations 41, wherein new weights are sampled from the learned probability distributions for each of the $N_S$ iterations 41. Finally, the normalized confidence values for all iterations are concatenated to form a tensor which is used as input for the post processing stage 35.

In the post processing stage 35 (see FIG. 2), a marginalization with respect to the weights of the Bayesian neural network is performed via an approximation by a weighted sum or mean value over the $N_S$ iterations 41 which are performed in the classification stage 33 (see FIG. 4). This marginalization is performed for each of the $N_C$ classes and for each grid cell 27. Based on this marginalization approximated by mean values, a predicted class is determined for each cell by selecting the class having the highest mean value for each cell, as described above.

In addition, the post processing stage 35 estimates the uncertainty for each grid cell 27, i.e. the uncertainty regarding the predicted class. First, a predictive uncertainty is calculated as the entropy of the predicted distributions after applying the SoftMax function, i.e. the entropy of the output of the classification stage 33. In detail, the predictive uncertainty is given by the following formula:

$$H[y^* | x^*, D] = -\sum_C p(y^* = C | x^*, D) \times \log p(y^* | x^*, D) \quad (1)$$

As described above, the distribution p can be approximated by a marginalization over the weights and by replacing the posterior distribution by the approximated distribution $q_\theta(W)$. By applying Monte Carlo sampling, the following approximation can be obtained and used for the estimation of the predictive uncertainty:

$$p(y^* | x^*, D) \approx \frac{1}{K} \sum_K p(y^* = C | x^*, w^k) \quad (2)$$

wherein K weights are sampled from the approximated distribution $w^K \sim q_\theta$.

The predictive uncertainty as defined by formula (1) can be decomposed into a sum of the epistemic uncertainty and the aleatoric uncertainty which are described above. The aleatoric uncertainty is estimated as the expected entropy over the network sample:

$$E_{w \sim p(w|D)}[H[y^* | x^*, D]] \quad (3)$$

This term defines the average entropy when the weights are fixed and is therefore independent of the uncertainty in the network parameters, i.e. independent from the epistemic uncertainty. That is, the expected entropy as defined in formula (3) exclusively depends on the input data and therefore represents the aleatoric uncertainty. Finally, the epistemic uncertainty is estimated by subtracting the aleatoric uncertainty as estimated based on formula (3) from the predictive uncertainty for each grid cell 27.

According to an alternative embodiment, in the classification stage 33 the sampling over the probability distributions may be replaced by a combination of a so-called dropout layer and further layers which perform a deterministic two-dimensional convolution. In the dropout layer, some of the high-level features from the feature extracting stage 31 are randomly selected and set to zero with a probability of 0.5 in order to obtain variability in the output of the classification stage. This variability is needed for the estimation of the uncertainty. The further deterministic convolutional layers include weights in each layer which are always fixed, i.e. during training, testing, and applying the neural network. Therefore, the classification stage of this alternative embodiment can be still regarded as probabilistic due to the random selection within the dropout layer. Since no probability distributions are needed for the alternative embodiment, the computational effort for this embodiment is reduced.

FIGS. 5 and 6 depict the correlation between estimated uncertainties and the precision of the neural network predictions based on test data. FIG. 5 depicts the correlation of the aleatoric uncertainty and the precision for each of the four classes labelled "free", "occupied", "moving" and "unknown", whereas FIG. 6 depicts the correlation for the epistemic uncertainty and the precision. It is noted that precision is a known key evaluation metric for neural networks.

On the x-axis of each diagram in FIGS. 5 and 6, the respective uncertainty (aleatoric or epistemic) is presented, whereas the y-axis refers to the precision. In detail, ten quantiles are defined for the respective uncertainty, wherein each quantile indicates a threshold for 10%, 20%, . . . most uncertain predictions. All curves in FIGS. 5 and 6 show a strictly monotonic increase in precision for a subsequently decreasing uncertainty. As a result, the method according to the disclosure comprising the hybrid neural network as described above is able to reliably predict aleatoric and epistemic uncertainty.

Figure 7:
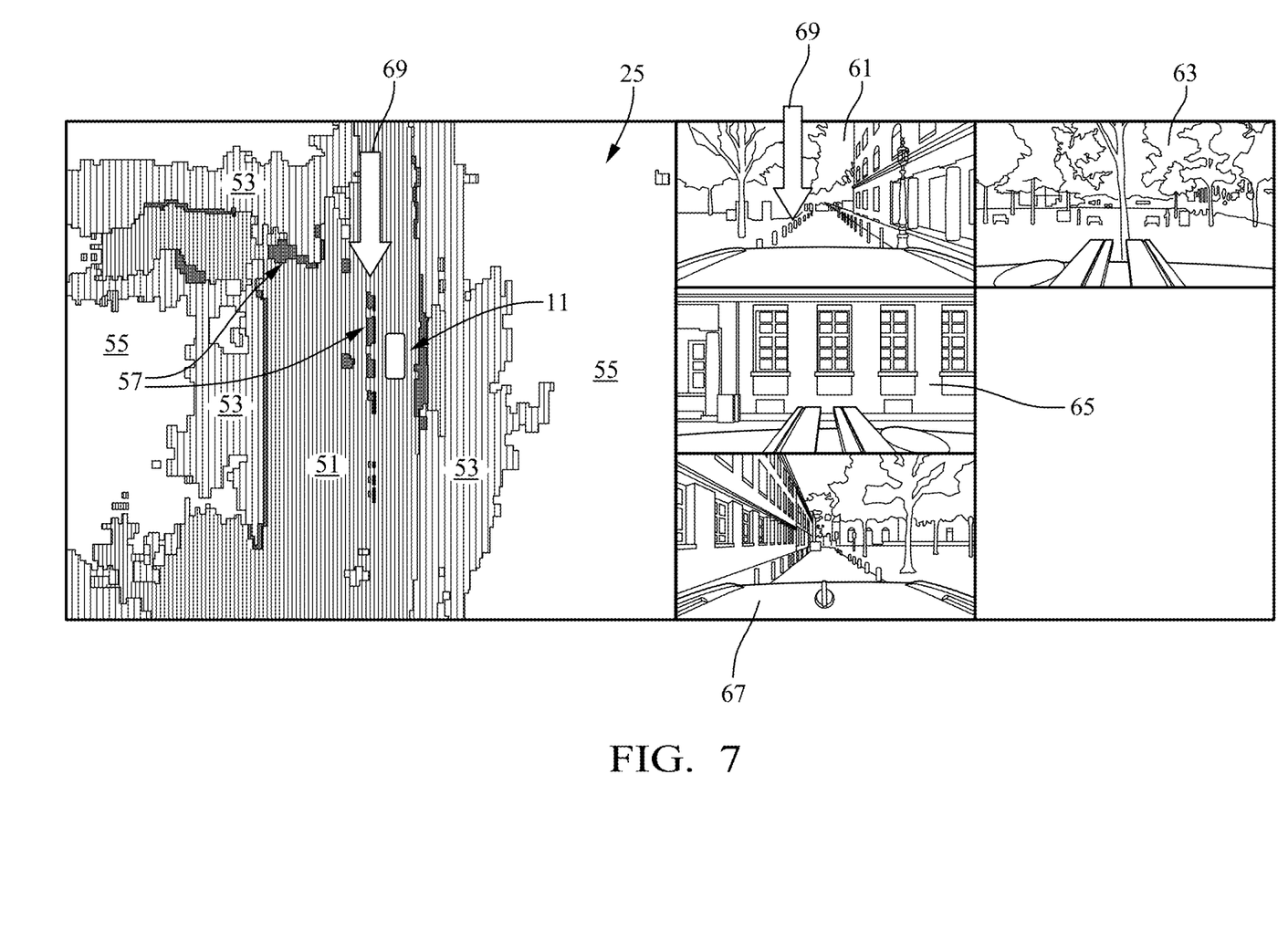
FIG. 7 depicts an example for performing a semantic segmentation.

FIG. 7 shows an example for a perception of the environment of a vehicle 11 via the system and the method as described above. On the left side of FIG. 7, the result of the semantic segmentation task is shown. In detail, the grid 25 around the vehicle 11 is depicted comprising areas 51 classified as free, areas 53 classified as occupied and areas 55 classified as unknown. In addition, the intensity within each area 51, 53, 55 represents the uncertainty which is estimated as described above. That is, the dark spots 57 represent highly uncertain areas, whereas the light areas include cells 27 having a low uncertainty.

On the right side of FIG. 7, corresponding camera pictures are shown for the environment of the vehicle 11, wherein the four pictures are taken when viewing into four different directions from the vehicle 11. 61 is a picture taken in forward direction, 63 represents the left side, 65 represents the right side, and 67 is taken for the backward direction. In the forward picture 61, bollards indicted by the arrow 69 can be recognized which limit the lane for the vehicle 11. That is, the cells 27 occupied by a respective bollard are obviously not free for driving.

On the left side of FIG. 7, the area where the bollards are located is also indicated by an arrow 69. According to the semantic segmentation, however, the area of the bollards erroneously belongs to the area 51 which is classified by the method as free.

In addition to the semantic segmentation, however, a very high uncertainty is estimated by the method for the area where the bollards are located, which is indicated by the dark spots 57. Therefore, since the uncertainty is additionally taken into account, e.g. the high uncertainty indicated by the dark spots 57 for the area where the bollards are located, an advanced driver assistance system of the vehicle 11 is able to prevent the vehicle 11 from coming into contact with highly uncertain areas 57. In the present case, an encounter with the bollards may be prevented due to the high uncertainty which is estimated for the corresponding grid cells 27 which are erroneously classified as free.

What is claimed is:

1. A method comprising:
 establishing, with a processing device of a vehicle, a deterministic neural network including deterministic weights and a Bayesian neural network including multiple layers; and
 determining, with the processing device, a semantic segmentation of an environment of the vehicle by:
 i) executing a feature extracting stage including:
 defining a grid of cells dividing the environment of the vehicle;
 receiving a radar point cloud from a plurality of radar sensors of the vehicle;
 assigning at least one feature of the radar point cloud to each grid cell; and
 extracting, using the deterministic neural network, high-level features for each grid cell;
 ii) executing a classification stage including:
 defining several classes for the grid cells;
 for the multiple layers of the Bayesian neural network, probabilistically determining various sets of weights; and estimating, via the Bayesian neural network, confidence values for each class and for each grid cell based on the high-level features and based on the various sets of weights; and iii) executing a post processing stage including:
determining, for each grid cell, a predicted class and an extent of uncertainty for the predicted class based on the confidence values, wherein executing the classification stage ii) comprises:
determining various sets of weights in a predefined number of iterations, each of the iterations providing a respective set of weights and respective confidence values for each class and each grid cell,
determining samples from learned probability distributions for each set of weights of the Bayesian neural network, and
convolving, in each iteration, the high-level features extracted in the feature extraction stage i) with the respective set of weights that are determined by the samples from the learned probability distributions.

2. The method according to claim 1,
wherein the extent of uncertainty includes an epistemic uncertainty and an aleatoric uncertainty.

3. The method according to claim 2,
wherein the aleatoric uncertainty is estimated based on an expected entropy of samples from the deterministic and Bayesian neural networks.

4. The method according to claim 3, wherein executing the post processing stage iii) comprises:
decomposing the uncertainty in the post processing stage; and
estimating a predictive uncertainty based on an entropy of an expected output of the Bayesian neural network, the epistemic uncertainty being estimated as a difference of the predictive uncertainty and the aleatoric uncertainty.

5. The method according to claim 1, wherein executing the post processing stage iii) comprises:
calculating a mean value over the respective confidence values of the predefined number of iterations for each class and for each grid cell, the highest mean value for each grid cell defining the predicted class of the respective cell.

6. The method according to claim 1,
wherein the neural network includes a dropout layer and various deterministic layers.

7. The method according to claim 1,
wherein the at least one feature of the radar point cloud comprises at least one of:
an amount of radar detections per cell, an average Doppler value for each cell, an average distance of each cell to the radar sensors, an average azimuth angle of each cell, or an average radar cross section of radar detections within each cell.

8. A system comprising a processing device for a vehicle, the processing device configured to:
establish a deterministic neural network including deterministic weights and a Bayesian neural network including multiple layers; and
determine a semantic segmentation of an environment of the vehicle by:
i) executing a feature extracting stage including:
defining a grid of cells dividing the environment of the vehicle;
receiving a radar point cloud from a plurality of radar sensors of the vehicle;
assigning at least one feature of the radar point cloud to each grid cell; and extracting, using the deterministic neural network, high-level features for each grid cell;
ii) executing a classification stage including:
defining several classes for the grid cells;
for the multiple layers of the Bayesian neural network, probabilistically determining various sets of weights; and
estimating, via the Bayesian neural network, confidence values for each class and for each grid cell based on the high-level features and based on the various sets of weights; and
iii) executing a post processing stage including:
determining, for each grid cell, a predicted class and an extent of uncertainty for the predicted class based on the confidence values,
wherein the processing device is configured to execute the classification stage ii) by:
determining various sets of weights in a predefined number of iterations, each of the iterations providing a respective set of weights and respective confidence values for each class and each grid cell,
determining samples from learned probability distributions for each set of weights of the Bayesian neural network, and
convolving, in each iteration, the high-level features extracted in the feature extraction stage i) with the respective set of weights that are determined by the samples from the learned probability distributions.

9. The system according to claim 8,
wherein the extent of uncertainty includes an epistemic uncertainty and an aleatoric uncertainty.

10. The system according to claim 9,
wherein the aleatoric uncertainty is estimated based on an expected entropy of samples from the deterministic and Bayesian neural networks.

11. The system according to claim 10, wherein the processing device is configured to execute the post processing stage iii) by:
decomposing the uncertainty in the post processing stage; and
estimating a predictive uncertainty based on an entropy of an expected output of the Bayesian neural network, the epistemic uncertainty being estimated as a difference of the predictive uncertainty and the aleatoric uncertainty.

12. The system according to claim 8, wherein the processing device is configured to execute the post processing stage iii) by:
calculating a mean value over the respective confidence values of the predefined number of iterations for each class and for each grid cell, the highest mean value for each grid cell defining the predicted class of the respective cell.

13. A non-transitory computer readable medium comprising instructions that when executed configure a processing device for a vehicle to:
establish a deterministic neural network including deterministic weights and a Bayesian neural network including multiple layers; and
determine a semantic segmentation of an environment of the vehicle by:
i) executing a feature extracting stage including:
defining a grid of cells dividing the environment of the vehicle;
receiving a radar point cloud from a plurality of radar sensors of the vehicle;
assigning at least one feature of the radar point cloud to each grid cell; and extracting, using the deterministic neural network, high-level features for each grid cell;
ii) executing a classification stage including:
defining several classes for the grid cells;
for the multiple layers of the Bayesian neural network, probabilistically determining various sets of weights; and
estimating, via the Bayesian neural network, confidence values for each class and for each grid cell based on the high-level features and based on the various sets of weights; and
iii) executing a post processing stage including:
determining, for each grid cell, a predicted class and an extent of uncertainty for the predicted class based on the confidence values,
wherein executing the classification stage ii) comprises:
determining various sets of weights in a predefined number of iterations, each of the iterations providing a respective set of weights and respective confidence values for each class and each grid cell,
determining samples from learned probability distributions for each set of weights of the Bayesian neural network, and
convolving, in each iteration, the high-level features extracted in the feature extraction stage i) with the respective set of weights that are determined by the samples from the learned probability distributions.

* * * * *